US012593361B2

(12) United States Patent
Jiang et al.

(10) Patent No.: US 12,593,361 B2
(45) Date of Patent: Mar. 31, 2026

(54) METHOD AND DEVICE FOR MULTI-CARRIER TRANSMISSION IN WIRELESS COMMUNICATION

(71) Applicant: APOGEE NETWORKS, LLC, Plano, TX (US)

(72) Inventors: Qi Jiang, Shanghai (CN); Xiaobo Zhang, Shanghai (CN)

(73) Assignee: APOGEE NETWORKS, LLC, Plano, TX (US)

( * ) Notice: Subject to any disclaimer, the term of this patent is extended or adjusted under 35 U.S.C. 154(b) by 230 days.

(21) Appl. No.: 18/218,013

(22) Filed: Jul. 4, 2023

(65) Prior Publication Data

US 2024/0015808 A1 Jan. 11, 2024

(51) Int. Cl.
*H04W 76/10* (2018.01)
*H04W 8/24* (2009.01)
*H04W 72/1263* (2023.01)

(52) U.S. Cl.
CPC ............. *H04W 76/10* (2018.02); *H04W 8/24* (2013.01); *H04W 72/1263* (2013.01)

(58) Field of Classification Search
CPC ........ H04L 5/001; H04L 5/0053; H04W 8/24; H04W 72/1263; H04W 72/1268; H04W 72/1273; H04W 72/232; H04W 76/10
See application file for complete search history.

(56) References Cited

U.S. PATENT DOCUMENTS

| | | | | |
|---|---|---|---|---|
| 2022/0408458 A1* | 12/2022 | MolavianJazi | ... | H04W 72/0453 |
| 2022/0408464 A1* | 12/2022 | MolavianJazi | ... | H04W 72/0453 |
| 2025/0106852 A1* | 3/2025 | Zhang | ................. | H04W 72/232 |

OTHER PUBLICATIONS

Third Generation Partnership Project, "Technical Specification Group Radio Access Network; NR; Physical channels and modulation (Release 17)," 3GPP TS 38.211 V17.2.0 (Jun. 2022).
Third Generation Partnership Project, "Technical Specification Group Radio Access Network; NR; Multiplexing and channel coding (Release 17)," 3GPP TS 38.212 V17.2.0 (Jun. 2022).
Third Generation Partnership Project, "Technical Specification Group Radio Access Network; NR; Physical layer procedures for control (Release 17)," 3GPP TS 38.213 V17.2.0 (Jun. 2022).

(Continued)

*Primary Examiner* — Thomas R Cairns
(74) *Attorney, Agent, or Firm* — Volpe Koenig

(57) ABSTRACT

The present application discloses a method and a device for wireless communications. A user equipment (UE) receives a first information block. The first information block is used to determine a first set of first-type cell sets. The UE receives a first signaling. The first signaling is used to determine a first cell set out of the first set of first-type cell sets. The first signaling comprises a first field and a second field. The first field is used to determine a first indication value. The first indication value corresponds to a starting serving cell and a first quantity value. The starting serving cell and the first quantity value are used to determine a second cell set. Any serving cell comprised in the second cell set belongs to the first cell set. The present application improves the way of indication with single Downlink Control Information (DCI) scheduling multiple carriers, thus enhancing the overall performance.

20 Claims, 4 Drawing Sheets

(56) References Cited

OTHER PUBLICATIONS

Third Generation Partnership Project, "Technical Specification Group Radio Access Network; NR; Physical layer procedures for data (Release 17)," 3GPP TS 38.214 V17.2.0 (Jun. 2022).

Third Generation Partnership Project, "Technical Specification Group Radio Access Network; NR; Physical layer measurements (Release 17)," 3GPP TS 38.215 V17.0.0 (Dec. 2021).

Third Generation Partnership Project, "Technical Specification Group Radio Access Network; NG Radio Access Network (NG-RAN); Stage 2 functional specification of User Equipment (UE) positioning in NG-RAN (Release 17)," 3GPP TS 38.305 V17.0.0 (Mar. 2022).

Third Generation Partnership Project, "Technical Specification Group Radio Access Network; NR; Medium Access Control (MAC) protocol specification (Release 17)," 3GPP TS 38.321 V17.0.0 (Mar. 2022).

Third Generation Partnership Project, "Technical Specification Group Radio Access Network; NR; Radio Resource Control (RRC) protocol specification (Release 17)," 3GPP TS 38.331 V17.0.0 (Mar. 2022).

Third Generation Partnership Project, "Technical Specification Group Radio Access Network; LTE Positioning Protocol (LPP) (Release 17)," 3GPP TS 37.355 V17.0.0 (Mar. 2022).

* cited by examiner

100 ➜

step101 receiving first information block, the first information block being used to determine M1 first-type cell sets, any first-type cell set of the M1 first-type cell sets comprising at least one serving cell, M1 being a positive integer greater than 1;

step102 receiving first signaling, the first signaling being used to determine first cell set out of the M1 first-type cell sets, the first cell set comprising multiple serving cells End

FIG. 1

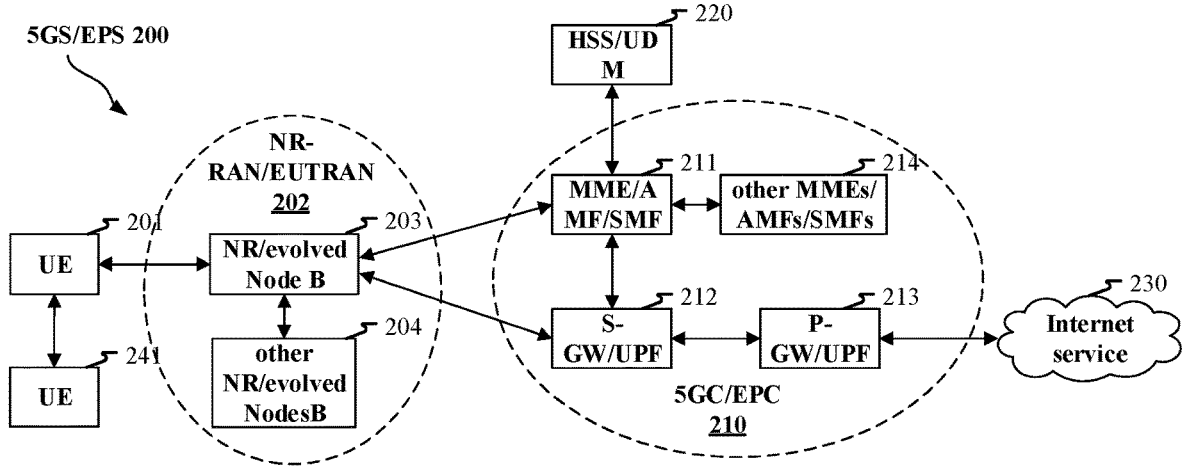

FIG. 2

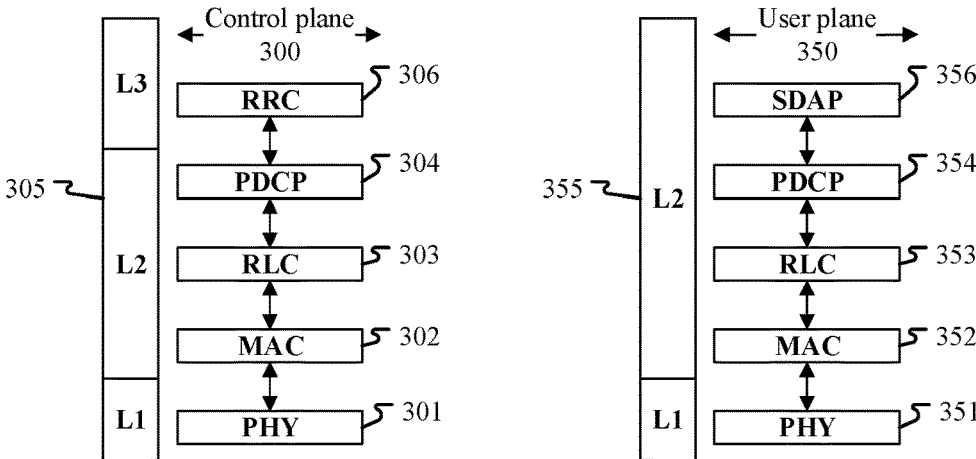

FIG. 3

METHOD AND DEVICE FOR MULTI-CARRIER TRANSMISSION IN WIRELESS COMMUNICATION

CROSS REFERENCE TO RELATED APPLICATIONS

This application claims the priority benefit of Chinese Patent Application No. 202210811093.0, filed on Jul. 11, 2022, the full disclosure of which is incorporated herein by reference.

BACKGROUND

Technical Field

The present application relates to methods and devices in wireless communication systems, and in particular to a multi-carrier transmission scheme and device in a wireless communication system.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

The multi-carrier (including Carrier Aggregation, abbreviated as CA, and Dual Connectivity, abbreviated as DC) techniques is an integral part of New Radio (NR) technology. To adapt to diverse application scenarios and meet different requests, the 3GPP has been working on the evolution of multi-carrier techniques since from the Rel-15.

SUMMARY

In the multi-carrier communications, for instance Carrier Aggregation (CA), the system supports Cross Carrier Scheduling. In networks supported by the existing standard, such as 5G New Radio (NR) in R17 and of previous versions, for multiple scheduled carriers, scheduling is only supported to be provided on carriers or Physical Downlink Control Channels (PDCCHs) respectively corresponding to the carriers, rather than through a same PDCCH on a same carrier. Among discussions in Rel-18, the subject of multicarrier enhancement is on hot debate, and under this subject a PDCCH can schedule data channels on multiple carriers simultaneously to enhance the overall performance.

To address the issue that a PDCCH schedules multiple carriers simultaneously in a multicarrier system in NR, the present application discloses a solution. It should be noted that the statement in the present application only takes PDCCH scheduling in the multicarrier case as a typical application scenario or example; This disclosure is also applicable to other scenarios confronting similar problems, such as other scenarios having higher demands on the capacity of control channels, which include but are not limited to capacity enhancement system, the system using higher frequency, coverage enhancement system, Unlicensed Spectrum communication, the Internet of Things (IoT), Ultra Reliable Low Latency Communications (URLLC) network and Vehicle-to-Everything (V2X), where similar technical effects can be achieved. Additionally, the adoption of a unified solution for various scenarios, including but not limited to multi-carrier scenarios, contributes to the reduction of hardcore complexity and costs. In the case of no conflict, the embodiments of a first node and the characteristics in the embodiments may be applied to a second node, and vice versa. Particularly, for interpretations of the terminology, nouns, functions and variables (unless otherwise specified) in the present application, refer to definitions given in TS36 series, TS38 series and TS37 series of 3GPP specifications. Refer to 3GPP TS38.211, TS38.212, TS38.213, TS38.214, TS38.215, TS38.321, TS38.331, TS38.305, or TS37.355, if necessary, for a better understanding of the present application.

The present application provides a method in a first node for wireless communications, comprising:
  receiving a first information block, the first information block being used to determine M1 first-type cell sets, any first-type cell set of the M1 first-type cell sets comprising at least one serving cell, M1 being a positive integer greater than 1; and
  receiving a first signaling, the first signaling being used to determine a first cell set out of the M1 first-type cell sets, the first cell set comprising multiple serving cells;
  herein, the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the above method is characterized in that: the second cell set is determined according to a first indication value, thus reducing the signaling overhead.

In one embodiment, the above method is characterized in that: the association between the second cell set and the first cell set is set up for achieving a reduction in the overhead of a signaling for indicating the second cell set.

In one embodiment, the above method is characterized in that: the way of indication that uses the starting serving cell and the first quantity value is adopted to ensure the flexibility and reduce the Payload Size of the PDCCH as well.

According to one aspect of the present application, characterized in that the first indication value is linear with an index of the starting serving cell in the first cell set; the first quantity value is no greater than a first threshold, the first threshold being a positive integer; the first threshold is equal to a parameter value of a capability report of the first node, or the first threshold is configurable.

In one embodiment, the above method is characterized in that: the size of a DCI format carried by the first signaling is associated with the first threshold, for the avoidance of waste of resources resulting from an oversize DCI format carried by the first signaling.

According to one aspect of the present application, characterized in that a number of serving cells comprised in a given first-type cell set among the M1 first-type cell sets is no less than a number of serving cells comprised in any first-type cell set among the M1 first-type cell sets; the given first-type cell set comprises P serving cells; P is a positive integer greater than 1; the first threshold is related to a value of P or is related to a value of M1.

In one embodiment, the above method is characterized in that: the first threshold is associated with a maximum number of cells that can be scheduled simultaneously in downlink or a maximum number of types of cell sets that can be scheduled in downlink, which further reduces the signaling overhead.

According to one aspect of the present application, characterized in that the first field comprised in the first signaling occupies X1 bits, where X1 is a positive integer greater than 1, and a value of X1 is related to the first threshold.

According to one aspect of the present application, characterized in that the first cell set comprises W1 serving cells, and the W1 serving cells are sorted in an order according to cell identifiers; the second cell set comprises W2 serving cells of the W1 serving cells, where the starting serving cell is a first one of the W2 serving cells, and the first quantity value is equal to a value of W2; W2 is a positive integer no greater than W1.

According to one aspect of the present application, characterized in that the W2 serving cells are consecutive among the W1 serving cells.

According to one aspect of the present application, characterized in comprising:

transmitting a first signal;

herein, the first cell set corresponds to scheduling for downlink, while the second cell set corresponds to scheduling for uplink; the second cell set comprises W2 serving cells, W2 being a positive integer greater than 1, and the first signal comprises W2 first sub-signals, the W2 first sub-signals respectively occupying W2 frequency-domain resource sets corresponding to the W2 serving cells.

According to one aspect of the present application, characterized in that the first cell set and the second cell set both correspond to a second indication value, the second indication value being a non-negative integer; the second indication value is used to determine at least one Control Channel Element (CCE) occupied by the first signaling, the first signaling determining the second indication value.

In one embodiment, the above method is characterized in that: the method of blind detection by determining a position of a first CCE occupied by a PDCCH candidate based on a field like a Carrier Indicator in the current cross carrier scheduling will not be changed, so as to ensure that a searching way of PDCCH Candidates can be followed no matter it is a downlink carrier or an uplink carrier being scheduled.

According to one aspect of the present application, characterized in comprising:

transmitting a second information block;

herein, the second information block is used to indicate a capability parameter set of a transmitter of the second information block, the capability parameter set of the transmitter of the second information block at least comprising a first parameter and a second parameter; the first parameter is used to indicate a number of downlink serving cells simultaneously scheduled by a PDCCH that are supported by the transmitter of the second information block, while the second parameter is used to indicate a number of uplink serving cells simultaneously scheduled by a PDCCH that are supported by the transmitter of the second information block.

In one embodiment, the above method is characterized in that the UE reports its capability of simultaneously scheduling the number of downlink carriers and the number of uplink carriers being supported to facilitate the base station's configuration and scheduling.

The present application provides a method in a second node for wireless communications, comprising:

transmitting a first information block, the first information block being used to determine M1 first-type cell sets, any first-type cell set of the M1 first-type cell sets comprising at least one serving cell, M1 being a positive integer greater than 1; and transmitting a first signaling, the first signaling being used to determine a first cell set out of the M1 first-type cell sets, the first cell set comprising multiple serving cells;

herein, the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

According to one aspect of the present application, characterized in that the first indication value is linear with an index of the starting serving cell in the first cell set; the first quantity value is no greater than a first threshold, the first threshold being a positive integer; the first threshold is equal to a parameter value of a capability report of the first node, or the first threshold is configurable.

According to one aspect of the present application, characterized in that a number of serving cells comprised in a given first-type cell set among the M1 first-type cell sets is no less than a number of serving cells comprised in any first-type cell set among the M1 first-type cell sets; the given first-type cell set comprises P serving cells; P is a positive integer greater than 1; the first threshold is related to a value of P or is related to a value of M1.

According to one aspect of the present application, characterized in that the first field comprised in the first signaling occupies X1 bits, where X1 is a positive integer greater than 1, and a value of X1 is related to the first threshold.

According to one aspect of the present application, characterized in that the first cell set comprises W1 serving cells, and the W1 serving cells are sorted in an order according to cell identifiers; the second cell set comprises W2 serving cells of the W1 serving cells, where the starting serving cell is a first one of the W2 serving cells, and the first quantity value is equal to a value of W2; W2 is a positive integer no greater than W1.

According to one aspect of the present application, characterized in that the W2 serving cells are consecutive among the W1 serving cells.

According to one aspect of the present application, characterized in comprising:

receiving a first signal;

herein, the first cell set corresponds to scheduling for downlink, while the second cell set corresponds to scheduling for uplink; the second cell set comprises W2 serving cells, W2 being a positive integer greater than 1, and the first signal comprises W2 first sub-signals, the W2 first sub-signals respectively occupying W2 frequency-domain resource sets corresponding to the W2 serving cells.

According to one aspect of the present application, characterized in that the first cell set and the second cell set both correspond to a second indication value, the second indication value being a non-negative integer; the second indication value is used to determine at least one CCE occupied by the first signaling, the first signaling determining the second indication value.

According to one aspect of the present application, characterized in comprising:

receiving a second information block;

herein, the second information block is used to indicate a capability parameter set of a transmitter of the second information block, the capability parameter set of the transmitter of the second information block at least comprising a first parameter and a second parameter; the first parameter is used to indicate a number of downlink serving cells simultaneously scheduled by a PDCCH that are supported by the transmitter of the second information block, while the second parameter is used to indicate a number of uplink serving cells simultaneously scheduled by a PDCCH that are supported by the transmitter of the second information block.

The present application provides a first node for wireless communications, comprising:

a first transceiver, receiving a first information block, the first information block being used to determine M1 first-type cell sets, any first-type cell set of the M1 first-type cell sets comprising at least one serving cell, M1 being a positive integer greater than 1; and a second transceiver, receiving a first signaling, the first signaling being used to determine a first cell set out of the M1 first-type cell sets, the first cell set comprising multiple serving cells;

herein, the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

The present application provides a second node for wireless communications, comprising:

a third transceiver, transmitting a first information block, the first information block being used to determine M1 first-type cell sets, any first-type cell set of the M1 first-type cell sets comprising at least one serving cell, M1 being a positive integer greater than 1; and a fourth transceiver, transmitting a first signaling, the first signaling being used to determine a first cell set out of the M1 first-type cell sets, the first cell set comprising multiple serving cells;

herein, the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the scheme in the present application is advantageous in the following aspect: enabling a PDCCH to schedule multiple carriers simultaneously on the premise that a slight modification is made only to the existing system, and in particular to blind detection, and in the meantime reducing the signaling overhead of the PDCCH and then enhancing the system's overall performance.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of processing of a first node according to one embodiment of the present application.

FIG. 2 illustrates a schematic diagram of a network architecture according to one embodiment of the present application.

FIG. 3 illustrates a schematic diagram of a radio protocol architecture of a user plane and a control plane according to one embodiment of the present application.

DESCRIPTION OF THE EMBODIMENTS

Figure 4:
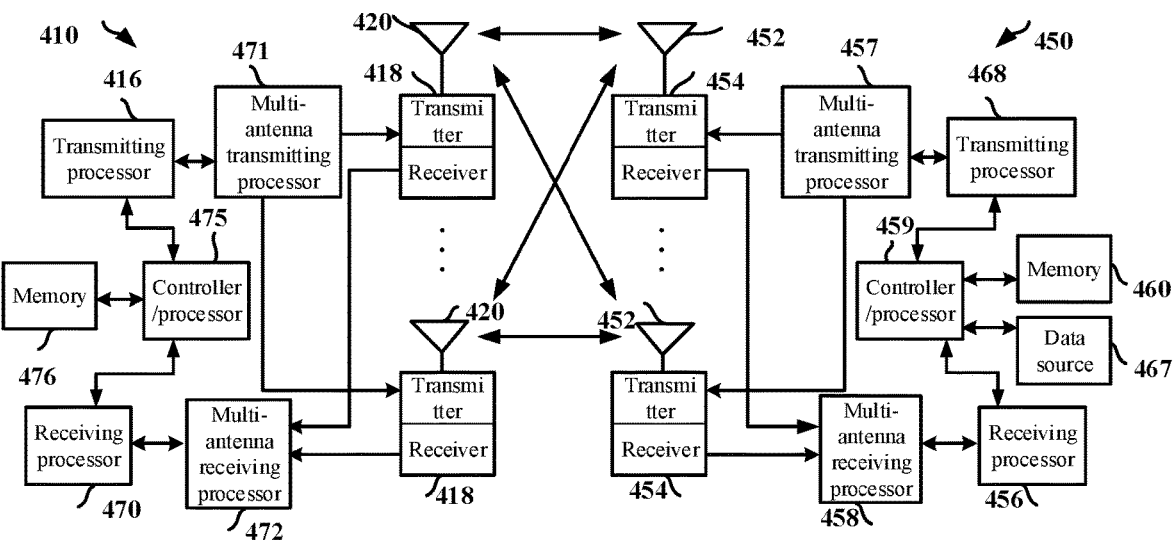
FIG. 4 illustrates a schematic diagram of a first communication device and a second communication device according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of processing of a first node, as shown in FIG. 1. In 100 illustrated by FIG. 1, each box represents a step. In Embodiment 1, the first node in the present application receives a first information block in step 101, the first information block being used to determine M1 first-type cell sets, any first-type cell set of the M1 first-type cell sets comprising at least one serving cell, M1 being a positive integer greater than 1; and receives a first signaling in step 102, the first signaling being used to determine a first cell set out of the M1 first-type cell sets, the first cell set comprising multiple serving cells.

In Embodiment 1, the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the first information block is transmitted via an air interface or a wireless interface.

In one embodiment, the first information block comprises all or part of a higher layer signaling or a physical layer signaling.

In one embodiment, the first information block comprises all or part of a Radio Resource Control (RRC) layer signaling, or the first information block comprises all or part of a Medium Access Control (MAC) layer signaling.

In one embodiment, the first information block comprises all or part of a System Information Block (SIB).

In one embodiment, the first information block is UE-specific.

In one embodiment, the first information block is configured per carrier, or the first information block is configured per bandwidth part (BWP), or the first information block is configured per search space.

In one embodiment, the first information block is configured per band or configured per Frequency Range (FR).

In one embodiment, the first information block comprises all or partial fields in an Information Element (IE) "CellGroupConfig".

In one embodiment, the first information block comprises a Field "secondaryCellGroup", or the first information block comprises a Field "masterCellGroup".

In one embodiment, the first information block is configured Per Cell group, or the first information block is configured Per PUCCH (PUCCH as the abbreviation for Physical Uplink Control Channel) group.

In one embodiment, the first information block comprises all or partial fields in an IE "ServingCellConfig".

In one embodiment, the first information block comprises all or partial fields in an IE "BWP-Downlink".

In one embodiment, the first information block comprises all or partial fields in an IE "crossCarrierSchedulingConfig".

In one embodiment, the first information block comprises all or partial fields in an IE "PDCCH-ServingCellConfig".

In one embodiment, the first information block comprises all or partial fields in an IE "pdcch-ConfigCommon".

In one embodiment, the first information block comprises all or partial fields in an IE "BWP-DownlinkCommon".

In one embodiment, the first information block comprises all or partial fields in an IE "BWP-DownlinkDedicated".

In one embodiment, the first information block comprises all or partial fields in an IE "pdcch-Config".

In one embodiment, the first information block comprises all or partial fields in an IE "SearchSpace".

In one embodiment, the first information block comprises all or partial fields in an IE "SearchSpaceExt-v1800", or the first information block comprises all or partial fields in an IE "SearchSpaceExt2-r18".

In one embodiment, the first information block comprises all or partial fields in a Downlink Control Information (DCI) format.

In one embodiment, the first information block being used to determine M1 first-type cell sets includes the following meaning: Part or all of the first information block is used for explicitly or implicitly indicating the M1 first-type cell sets.

In one embodiment, the first information block being used to determine M1 first-type cell sets includes the following meaning: Part or all of the first information block is used for explicitly or implicitly indicating any first-type cell set among the M1 first-type cell sets.

In one embodiment, the first information block being used to determine M1 first-type cell sets includes the following meaning: Part or all of the first information block is used for explicitly or implicitly indicating all serving cells comprised in any first-type cell set among the M1 first-type cell sets.

In one embodiment, the first information block being used to determine M1 first-type cell sets includes the following meaning: Part or all of the first information block is used for explicitly or implicitly indicating a list made up of the M1 first-type cell sets.

In one embodiment, the first information block being used to determine M1 first-type cell sets includes the following meaning: Part or all of the first information block is used for explicitly or implicitly indicating serving cells comprised by the M1 first-type cell sets.

In one embodiment, the first information block being used to determine M1 first-type cell sets includes the following meaning: Part or all of the first information block is used for explicitly or implicitly adding the M1 first-type cell sets into a list.

In one embodiment, the first information block being used to determine M1 first-type cell sets includes the following meaning: Part or all of the first information block is used for explicitly or implicitly releasing first-type cell sets to obtain a list made up of the M1 first-type cell sets.

In one embodiment, the first information block being used to determine M1 first-type cell sets includes the following meaning: Part or all of the first information block is used for explicitly or implicitly adding serving cells that constitute a first-type cell set among the M1 first-type cell sets.

In one embodiment, the first information block being used to determine M1 first-type cell sets includes the following meaning: Part or all of the first information block is used for explicitly or implicitly releasing serving cells to obtain a first-type cell set among the M1 first-type cell sets.

In one embodiment, the first information block being used to determine M1 first-type cell sets includes the following meaning: Part or all of the first information block is used for explicitly or implicitly indicating a number of serving cells comprised in at least one first-type cell set among the M1 first-type cell sets.

In one embodiment, the first information block being used to determine M1 first-type cell sets includes the following meaning: Part or all of the first information block is used for explicitly or implicitly indicating an upper limit of a number of serving cells comprised in at least one first-type cell set among the M1 first-type cell sets.

In one embodiment, the first information block being used to determine M1 first-type cell sets includes the following meaning: Part or all of the first information block is used for explicitly or implicitly indicating all serving cells comprised by the M1 first-type cell sets collectively, where all the serving cells comprised by the M1 first-type cell sets collectively make up the M1 first-type cell sets abiding by a pre-defined rule.

In one embodiment, the first information block being used to determine M1 first-type cell sets includes the following meaning: Part or all of the first information block is used for explicitly or implicitly indicating a target first-type cell set, where all the serving cells comprised by the target first-type cell set make up the M1 first-type cell sets abiding by a pre-defined rule.

In one embodiment, the first information block being used to determine M1 first-type cell sets includes the following meaning: Part or all of the first information block is used for explicitly or implicitly indicating all serving cells comprised by the M1 first-type cell sets collectively, where all the serving cells comprised by the M1 first-type cell sets collectively are indexed in an order of $0, \ldots, N_{cell}-1$, where $N_{cell}$ represents a total number of the serving cells comprised by the M1 first-type cell sets collectively, $d^{(Q)}$ represents a first-type cell set among the M1 first-type cell sets that comprises Q serving cell(s), and each index of serving cell(s) comprised by the first-type cell set $d^{(Q)}$ satisfies $$Q \cdot \left\{ \left\lfloor \frac{d^{(Q)} \cdot N_{cell}}{Q \cdot M^{(Q)}} \right\rfloor \mathrm{mod} \lfloor N_{cell} / Q \rfloor \right\} + q$$

where $q=0, \ldots, Q-1$, $M^{(Q)}$ indicating a number of first-type cell set(s) respectively comprising Q serving cell(s) among the M1 first-type cell sets.

In one embodiment, the technical feature of "the first information block being used to determine M1 first-type cell sets" includes the following meaning: Part or all of the first information block is used for explicitly or implicitly indicating a target first-type cell set, where all the serving cells comprised by the target first-type cell set are indexed in an order of $0, \ldots, N_{cell}-1$, where $N_{cell}$ represents a total number of the serving cells comprised by the target first-type cell set, $d^{(Q)}$ represents a first-type cell set among the M1 first-type cell sets that comprises Q serving cell(s), and each index of serving cell(s) comprised by the first-type cell set $d^{(Q)}$ satisfies $$Q \cdot \left\{ \left\lfloor \frac{d^{(Q)} \cdot N_{cell}}{Q \cdot M^{(Q)}} \right\rfloor \mathrm{mod} \lfloor N_{cell} / Q \rfloor \right\} + q$$

where $q=0, \ldots, Q-1$, $M^{(Q)}$ indicating a number of first-type cell set(s) respectively comprising Q serving cell(s) among the M1 first-type cell sets.

In one embodiment, the M1 first-type cell sets constitute a cell set list.

In one embodiment, each serving cell comprised by any first-type cell set among the M1 first-type cell sets is an activated cell.

In one embodiment, any serving cell comprised by any first-type cell set among the M1 first-type cell sets is a serving cell that can transmit a Physical Downlink Shared Channel (PDSCH).

In one embodiment, any two first-type cell sets among the M1 first-type cell sets are different.

In one embodiment, there are two first-type cell sets among the M1 first-type cell sets that are identical.

In one embodiment, any first-type cell set among the M1 first-type cell sets is a set of serving cells that can be scheduled simultaneously by one DCI format or a PDCCH.

In one embodiment, any first-type cell set among the M1 first-type cell sets is a set of serving cells to which PDSCHs that can be scheduled simultaneously by one DCI format or a PDCCH respectively belong.

In one embodiment, any first-type cell set among the M1 first-type cell sets is a list of serving cells.

In one embodiment, all serving cells comprised by one first-type cell set among the M1 first-type cell sets belong to a same band.

In one embodiment, all serving cells comprised by one first-type cell set among the M1 first-type cell sets belong to a same frequency range (FR).

In one embodiment, a physical layer channel occupied by the first signaling includes a PDCCH.

In one embodiment, the first signaling corresponds to a DCI.

In one embodiment, the first signaling is a Downlink (DL) Grant.

In one embodiment, the first signaling is an Uplink (UL) Grant.

In one embodiment, the second field comprised in the first signaling is used to determine a DCI format corresponding to the first signaling.

In one embodiment, the second field comprised in the first signaling is used to determine whether the first signaling is used for scheduling a PDSCH or a PUSCH.

In one embodiment, the second field comprised in the first signaling corresponds to information of "Identifier for DCI formats" in a DCI.

In one embodiment, the second field comprised in the first signaling is used to indicate a transmission direction of a signal scheduled by the first signaling.

In one embodiment, the first indication value is a positive integer.

In one embodiment, the first field comprised in the first signaling is a Resource Indication Value (RIV).

In one embodiment, the first field comprised in the first signaling is a Carrier Indication Value (CIV).

In one embodiment, any serving cell comprised by the second cell set is used for uplink scheduling.

In one embodiment, any serving cell comprised by the first cell set is used for downlink scheduling.

In one embodiment, the first cell set and the second cell set respectively correspond to scheduling of a downlink and scheduling of an uplink.

In one embodiment, when the second field in the first signaling indicates "1", a direction of a link scheduled by the first signaling is downward; when the second field in the first signaling indicates "0", a direction of a link scheduled by the first signaling is upward.

In one embodiment, the first cell set at least comprises one serving cell that is a serving cell other than serving cells comprised by the second cell set.

In one embodiment, the first signaling comprises a target field, the target field of the first signaling being used to determine the first cell set out of the M1 first-type cell sets.

In one embodiment, the first signaling comprises a target field, the target field of the first signaling being used to indicate the first cell set among the M1 first-type cell sets.

In one embodiment, the target field comprised by the first signaling is used for scheduling one serving cell or multiple serving cells simultaneously.

In one embodiment, the target field comprised by the first signaling is used for scheduling one PDSCH or multiple PDSCHs simultaneously.

In one embodiment, the target field comprised by the first signaling is used for scheduling one Transport Block (TB) or multiple TBs simultaneously.

In one embodiment, the target field comprised by the first signaling is used for scheduling one bit block or multiple bit blocks simultaneously.

In one embodiment, the target field comprised by the first signaling is used for indicating one or multiple serving cells being scheduling simultaneously.

In one embodiment, the target field comprised by the first signaling corresponds to information "Carrier indicator" in a DCI.

In one embodiment, the target field comprised by the first signaling corresponds to information "Multi-Carrier indicator" in a DCI.

In one embodiment, the target field comprised by the first signaling corresponds to information "Multi-Carrier Scheduling" in a DCI.

In one embodiment, the target field comprised by the first signaling corresponds to information "Multi-Carrier Scheduling Indicator" in a DCI.

In one embodiment, the first field comprised by the first signaling is used for scheduling one serving cell or multiple serving cells simultaneously.

In one embodiment, the first field comprised by the first signaling is used for scheduling one PUSCH or multiple PUSCHs simultaneously.

In one embodiment, the first field comprised by the first signaling is used for scheduling one TB or multiple TBs simultaneously.

In one embodiment, the first field comprised by the first signaling is used for scheduling one bit block or multiple bit blocks simultaneously.

In one embodiment, M1 is no greater than 4.

In one embodiment, M1 is no greater than 8.

In one embodiment, M1 is no greater than 16.

In one embodiment, M1 is no greater than 32.

In one embodiment, a number of bits occupied by the target field comprised by the first signaling is equal to 3.

In one embodiment, a number of bits occupied by the target field comprised by the first signaling is equal to 4.

In one embodiment, a number of bits occupied by the target field comprised by the first signaling is equal to 5.

In one embodiment, a number of bits occupied by the target field comprised by the first signaling is no greater than 6.

In one embodiment, there exists only one first-type cell set among the M1 first-type cell sets that comprises one serving cell.

In one embodiment, any first-type cell set among the M1 first-type cell sets comprises more than one serving cell.

Embodiment 2

Embodiment 2 illustrates a schematic diagram of a network architecture, as shown in FIG. 2.

Embodiment 2 illustrates a schematic diagram of a network architecture according to one embodiment of the present application, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE241, an NG-RAN 202, a 5G-Core Network/Evolved Packet Core (5GC/EPC) 210, a Home Subscriber Server/Unified Data Management(HSS/UDM) 220, a ProSe feature250 and ProSe application server 230. The V2X communication architecture may be interconnected with other access networks. For simple description, the entities/interfaces are not shown. As shown in FIG. 2, theV2X communication architecture provides packet switching services. Those skilled in the art will find it easy to understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPSs), multimedia devices, video devices, digital audio players (for example, MP3 players), cameras, games consoles, unmanned aerial vehicles, air vehicles, narrowband physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected with the 5G-CN/

EPC 210 via an S1/NG interface. The 5G-CN/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming (PSS) services. The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 corresponds to the first node in the present application, and the gNB203 corresponds to the second node in the present application.

In one embodiment, the UE201 supports multiple carriers being scheduled by a same DCI.

In one embodiment, the UE201 supports multiple serving cells being scheduled by a same DCI.

In one embodiment, the UE 201 supports cross-carrier scheduling.

In one embodiment, the NR node B corresponds to the second node in the present application.

In one embodiment, the NR node B supports multiple carriers being scheduled by a same DCI.

In one embodiment, the NR node B supports multiple serving cells being scheduled by a same DCI.

In one embodiment, the NR node B supports cross-carrier scheduling.

In one embodiment, the NR node B is a base station.

In one embodiment, the NR node B is a cell.

In one embodiment, the NR node B comprises multiple cells.

In one embodiment, the NR node B is used to determine transmissions on multiple serving cells.

In one embodiment, the first node in the present application corresponds to the UE201, and the second node in the present application corresponds to the NR node B.

In one embodiment, the first node and the second node in the present application are respectively the UE201 and the gNB203.

In one embodiment, the first node in the present application is the UE 201, and the second node in the present application is the UE241.

Embodiment 3

Embodiment 3 illustrates a schematic diagram of a radio protocol architecture of a user plane and a control plane according to the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), is represented by three layers, which are a layer 1, a layer 2 and a layer 3, respectively. The layer 1 (L1) is the lowest layer which performs signal processing functions of various PHY layers. The L1 is called PHY 301 in the present application. The layer 2 (L2) 305 is above the PHY 301, and is in charge of the link between the first communication node and the second communication node via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and also provides support for handover of a second communication node between first communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the PDCP304 of the second communication node is used for generating scheduling of the first communication node.

In one embodiment, the PDCP354 of the second communication node is used for generating scheduling of the first communication node.

In one embodiment, the first information block is generated by the MAC302 or the MAC352.

In one embodiment, the first information block is generated by the RRC 306.

In one embodiment, the first signaling is generated by the MAC302 or the MAC352.

In one embodiment, the first signaling is generated by the PHY 301 or the PHY 351.

In one embodiment, the second information block is generated by the MAC302 or the MAC352.

In one embodiment, the second information block is generated by the RRC 306.

In one embodiment, the first signal is generated by the PHY 301 or the PHY 351.

In one embodiment, the first signal is generated by the MAC302 or the MAC352.

In one embodiment, the first signal is generated by the RRC 306.

In one embodiment, the first node is a terminal.

In one embodiment, the first node is a relay.

In one embodiment, the second node is a terminal.

In one embodiment, the second node is a relay.

In one embodiment, the second node is a base station.

In one embodiment, the second node is a gNB.

In one embodiment, the second node is a Transmitter Receiver Point (TRP).

In one embodiment, the second node is used for managing multiple TRPs.

In one embodiment, the second node is used for managing multiple nodes of cells.

In one embodiment, the second node is used for managing multiple nodes of serving cells.

Embodiment 4

Embodiment 4 illustrates a schematic diagram of a first communication device and a second communication device according to the present application, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 provides functions of the L2 layer. In the transmission from the second communication device 410 to the first communication device 450, the controller/processor 475 provides header compression, encryption, packet segmentation and reordering, and multiplexing between a logical channel and a transport channel, and radio resource allocation of the first communication device 450 based on various priorities. The controller/processor 475 is also in charge of HARQ operation, a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the second communication device 410 to the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts baseband multicarrier symbol streams which have gone through reception analog precoding/beamforming operations from time domain to frequency domain using FFT. In frequency domain, physical layer data signals and reference signals are de-multiplexed by the receiving processor 456, where the reference signals are used for channel estimation while data signals are processed in the multi-antenna receiving processor 458 by multi-antenna detection to recover any spatial stream targeting the first communication device 450. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer. Or various control signals can be provided to the L3 for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication node 410 to the first communication node 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory, the at least one memory comprises computer program codes; the at least one memory and the computer program codes are configured to be used in collaboration with the at least one processor. The first communication device 450 at least: firstly receives a first information block, the first information block being used to determine M1 first-type cell sets, any first-type cell set of the M1 first-type cell sets comprising at least one serving cell, M1 being a positive integer greater than 1; and then receives a first signaling, the first signaling being used to determine a first cell set out of the M1 first-type cell sets, the first cell set comprising multiple serving cells; the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the first communication node 450 comprises a memory that stores a computer readable instruction program, the computer readable instruction program generates actions when executed by at least one processor, which include: firstly receiving a first information block, the first information block being used to determine M1 first-type cell sets, any first-type cell set of the M1 first-type cell sets comprising at least one serving cell, M1 being a positive integer greater than 1; and then receiving a first signaling, the first signaling being used to determine a first cell set out of the M1 first-type cell sets, the first cell set comprising multiple serving cells; the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the second communication device 410 comprises at least one processor and at least one memory, the at least one memory comprises computer program codes; the at least one memory and the computer program codes are configured to be used in collaboration with the at least one processor. The second communication device 410 at least: firstly transmits a first information block, the first information block being used to determine M1 first-type cell sets, any first-type cell set of the M1 first-type cell sets comprising at least one serving cell, M1 being a positive integer greater than 1; and then transmits a first signaling, the first signaling being used to determine a first cell set out of the M1 first-type cell sets, the first cell set comprising multiple serving cells; the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the second communication device 410 comprises a memory that stores a computer readable instruction program, the computer readable instruction program generates actions when executed by at least one processor, which include: firstly transmitting a first information block, the first information block being used to determine M1 first-type cell sets, any first-type cell set of the M1 first-type cell sets comprising at least one serving cell, M1 being a positive integer greater than 1; and then transmitting a first signaling, the first signaling being used to determine a first cell set out of the M1 first-type cell sets, the first cell set comprising multiple serving cells; the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the first communication device 450 corresponds to the first node in the present application.

In one embodiment, the second communication device 410 corresponds to the second node in the present application.

In one embodiment, the first communication device 450 is a UE.

In one embodiment, the first communication device 450 is a terminal.

In one embodiment, the first communication device 450 is a relay.

In one embodiment, the first communication device 450 is a terminal using a first PDCCH to schedule multiple carriers simultaneously.

In one embodiment, the second communication device 410 is a base station.

In one embodiment, the second communication device 410 is a relay.

In one embodiment, the second communication device 410 is network equipment.

In one embodiment, the second communication device 410 is a serving cell.

In one embodiment, the second communication device 410 is a TRP.

In one embodiment, the second communication device 410 is abase station using a first PDCCH to schedule multiple carriers simultaneously.

In one embodiment, at least the first four of the antenna 452, the receiver 454, the multi-antenna receiving processor 458, the receiving processor 456, and the controller/processor 459 are used for receiving a first information block; at least the first four of the antenna 420, the transmitter 418, the multi-antenna transmitting processor 471, the transmitting processor 416 and the controller/processor 475 are used for transmitting a first information block.

In one embodiment, at least the first four of the antenna 452, the transmitter 454, the multi-antenna transmitting processor 457, the transmitting processor 468 and the controller/processor 459 are used for receiving a first signaling; at least the first four of the antenna 420, the receiver 418, the multi-antenna receiving processor 472, the receiving processor 470 and the controller/processor 475 are used for transmitting a first signaling.

In one embodiment, at least the first four of the antenna 452, the transmitter 454, the multi-antenna transmitting processor 457, the transmitting processor 468 and the controller/processor 459 are used for transmitting a first signal; at least the first four of the antenna 420, the receiver 418, the multi-antenna receiving processor 472, the receiving processor 470 and the controller/processor 475 are used for receiving a first signal.

In one embodiment, at least the first four of the antenna 452, the transmitter 454, the multi-antenna transmitting processor 457, the transmitting processor 468 and the controller/processor 459 are used for transmitting a second information block; at least the first four of the antenna 420, the receiver 418, the multi-antenna receiving processor 472, the receiving processor 470 and the controller/processor 475 are used for receiving a second information block.

Embodiment 5

Figure 5:
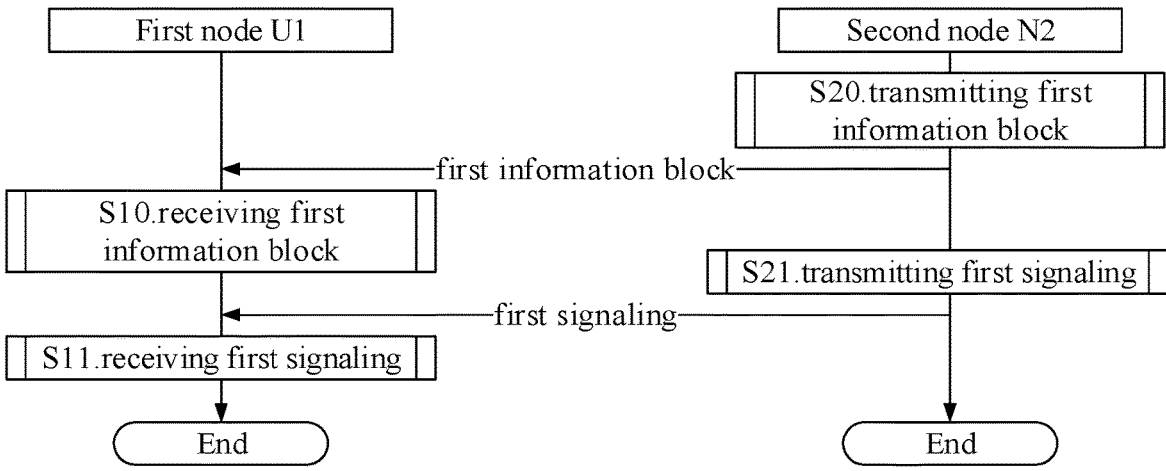
FIG. 5 illustrates a flowchart of transmission between a first node and a second node according to one embodiment of the present application.

Embodiment 5 illustrates a flowchart of transmission between a first node and a second node according to one embodiment of the present application, as shown in FIG. 5. In FIG. 5, a first node U1 and a second node N2 are in communication via a radio link. It should be particularly noted that the sequence illustrated herein does not set any limit to the signal transmission order or implementation order in the present application. In case of no conflict, the embodiments, subembodiments, and subsidiary embodiments in Embodiment 5 can be applied to any embodiment of Embodiment 6 or Embodiment 7; reversely, in case of no conflict, any of the embodiments, subembodiments, and subsidiary embodiments in Embodiment 6 or 7 can be applied to Embodiment 5.

The first node U1 receives a first information block in step S10; and receives a first signaling in step S11.

The second node N2 transmits a first information block in step S20; and transmits a first signaling in step S21.

In Embodiment 5, the first information block is used to determine M1 first-type cell sets, any first-type cell set of the M1 first-type cell sets comprising at least one serving cell, M1 being a positive integer greater than 1; the first signaling is used to determine a first cell set out of the M1 first-type cell sets, the first cell set comprising multiple serving cells; the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

Typically, the first indication value is linear with an index of the starting serving cell in the first cell set; the first quantity value is no greater than a first threshold, the first threshold being a positive integer; the first threshold is equal to a parameter value of a capability report of the first node, or the first threshold is configurable.

In one embodiment, the first cell set comprises W1 serving cells, W1 being a positive integer greater than 1, and the starting serving cell is an i-th serving cell among the W1 serving cells; the index of the starting serving cell in the first cell set is equal to (i−1), where i is a positive integer.

In one embodiment, the first cell set comprises W1 serving cells, W1 being a positive integer greater than 1, and the starting serving cell is a j-th serving cell among the W1 serving cells; the index of the starting serving cell in the first cell set is equal to j, where j is a positive integer.

In one embodiment, the first indication value is used to determine the starting serving cell and the first quantity value.

In one embodiment, the first indication value is linear with a number of serving cells comprised in the first cell set.

In one embodiment, the first indication value is linear with a number of serving cells comprised by a first-type cell set that comprises the most serving cells among the M1 first-type cell sets.

In one embodiment, the first quantity value is a positive integer.

In one embodiment, the first quantity value is related to a number of serving cells comprised in the first cell set.

In one subembodiment, the number of serving cells comprised in the first cell set is used to determine a value range of the first quantity value.

In one subembodiment, when the number of serving cells comprised in the first cell set is no greater than 4, the first quantity value is no greater than the number of serving cells comprised in the first cell set.

In one subembodiment, when the number of serving cells comprised in the first cell set is greater than 4 and no greater than 8, the first quantity value is no greater than a product of the number of serving cells comprised in the first cell set and a first coefficient, the first coefficient being a decimal between 0 and 1.

In one subsidiary embodiment of the above subembodiment, the first coefficient is equal to 0.5.

In one subsidiary embodiment of the above subembodiment, the first coefficient is equal to 0.75.

In one subsidiary embodiment of the above subembodiment, the first coefficient is equal to 0.25.

In one embodiment, a number of serving cells comprised in the first cell set is equal to $N_C$, an index of the starting serving cell is equal to $Cell_{start}$, the first quantity value is equal to $L_C$, and the first indication value is equal to CVI, the CVI satisfying the following relationship:

$$when(L_C-1)\leq\lfloor N_C/2\rfloor,CVI=N_C(L_C-1)+Cell_{start};$$

$$when(L_C-1)>\lfloor N_C/2\rfloor,CVI=N_C(N_C-L_C+1)+(N_C-1-Cell_{start}).$$

Typically, a number of serving cells comprised in a given first-type cell set among the M1 first-type cell sets is no less than a number of serving cells comprised in any first-type cell set among the M1 first-type cell sets; the given first-type cell set comprises P serving cells; P is a positive integer greater than 1; the first threshold is related to a value of P or is related to a value of M1.

In one embodiment, P is equal to 4.

In one embodiment, P is equal to 8.

In one embodiment, P is equal to 16.

In one embodiment, P is equal to 32.

In one embodiment, the value of P is used to determine the first threshold.

In one subembodiment, the first threshold is equal to $\lfloor P/2\rfloor$.

In one subembodiment, the first threshold is equal to $\lfloor P/4\rfloor$.

In one subembodiment, the first threshold is equal to a product of P and a first factor, the first factor being a decimal between 0 and 1.

In one embodiment, the value of M1 is used to determine the first threshold.

In one subembodiment, the first threshold is equal to $\lfloor (M1)/2\rfloor$.

In one subembodiment, the first threshold is equal to $\lfloor (M1)/4\rfloor$.

In one subembodiment, the first threshold is equal to a product of M1 and a second factor, the second factor being a decimal between 0 and 1.

Typically, the first field comprised in the first signaling occupies X1 bits, where X1 is a positive integer greater than 1, and a value of X1 is related to the first threshold.

In one embodiment, the first threshold is configured through an RRC layer signaling.

In one embodiment, the first threshold is configured through a MAC layer signaling.

In one embodiment, the first threshold is configured through a MAC CE.

In one embodiment, a value of X1 is linear with the first threshold.

In one embodiment, a value of X1 is equal to a product of the first threshold and a given coefficient.

In one subembodiment, the given coefficient is fixed.

In one subembodiment, the given coefficient is configured through an RRC signaling.

In one subembodiment, the given coefficient is a decimal between 0 and 1.

In one subembodiment, the given coefficient is a positive integer greater than 1.

Typically, the first cell set comprises W1 serving cells, and the W1 serving cells are sorted in an order according to cell identifiers; the second cell set comprises W2 serving cells of the W1 serving cells, where the starting serving cell is a first one of the W2 serving cells, and the first quantity value is equal to a value of W2; W2 is a positive integer no greater than W1.

In one embodiment, the cell identifier includes a ServCellIndex.

In one embodiment, the cell identifier includes a schedulingCellId.

In one embodiment, the cell identifier includes a Carrier Indicator Field (CIF).

In one embodiment, the cell identifier includes a Physical Cell Identity (PCI).

In one embodiment, the W1 serving cells respectively correspond to W1 cell identifiers.

In one embodiment, the sentence that the W1 serving cells are sorted in an order according to cell identifiers includes a meaning that the W1 serving cells are sorted according to an ascending order of values of the W1 cell identifiers.

In one embodiment, the sentence that the W1 serving cells are sorted in an order according to cell identifiers includes a meaning that the W1 serving cells are sorted according to a descending order of values of the W1 cell identifiers.

In one embodiment, the W2 serving cells correspond to W2 cell identifiers among the W1 cell identifiers, where the starting serving cell corresponds to a serving cell corresponding to a smallest cell identifier among the W2 cell identifiers.

In one embodiment, the W2 serving cells correspond to W2 cell identifiers among the W1 cell identifiers, where the starting serving cell corresponds to a serving cell corresponding to a largest cell identifier among the W2 cell identifiers.

Typically, the W2 serving cells are consecutive among the W1 serving cells.

In one embodiment, the phrase that "the W2 serving cells are consecutive among the W1 serving cells" includes a meaning that the W1 serving cells are sorted in an order, and the W2 serving cells are W2 consecutive serving cells among the W1 serving cells.

In one embodiment, the phrase that "the W2 serving cells are consecutive among the W1 serving cells" includes a meaning that the W1 serving cells respectively correspond to W1 cell identifiers, and the W2 serving cells are W2 serving cells with W2 adjacent cell identifiers among the W1 serving cells.

In one embodiment, the phrase that "the W2 serving cells are consecutive among the W1 serving cells" includes a meaning that the W1 serving cells respectively correspond to W1 positional indexes, marked from a positional index #0 to a positional index #(W1-1), and the W2 serving cells correspond to W2 serving cells indexed from a positional index #i to a positional index #(i+W2-1), where i is an integer among 0 through (W1-1), and (i+W2-1) is an integer no greater than (W1-1).

Typically, the first cell set and the second cell set both correspond to a second indication value, the second indication value being a non-negative integer; the second indication value is used to determine at least one CCE occupied by the first signaling, the first signaling determining the second indication value.

In one embodiment, the target field comprised by the first signaling is used to indicate the second indication value.

In one embodiment, the target field comprised by the first signaling is used to explicitly indicate the second indication value.

In one embodiment, the target field comprised by the first signaling is used to implicitly indicate the second indication value.

In one embodiment, the target field comprised by the first signaling is used to determine the second indication value.

In one embodiment, the first signaling is used for explicitly indicating the second indication value.

In one embodiment, the first signaling is used for implicitly indicating the second indication value.

In one embodiment, the second indication value is a non-negative integer.

In one embodiment, the second indication value is a positive integer.

In one embodiment, the second indication value is used to determine (a) position(s) of at least one CCE occupied by the first signaling in a CORESET by which the CCE(s) is(are) comprised.

In one embodiment, the second indication value is used to determine (a) position(s) of at least one CCE occupied by the first signaling in a search space by which the CCE(s) is(are) comprised.

In one embodiment, the second indication value is used to determine (a) position(s) of at least one CCE occupied by a PDCCH Candidate occupied by the first signaling in a CORESET by which the CCE(s) is(are) comprised.

In one embodiment, the second indication value is used to determine (a) position(s) of at least one CCE occupied by a PDCCH Candidate occupied by the first signaling in a search space by which the CCE(s) is(are) comprised.

In one embodiment, the phrase that "the first cell set and the second cell set both correspond to a second indication value" includes a meaning that the first indication value is used to determine the first cell set out of the M1 first-type cell sets, and the first indication value is used to determine the second cell set in the first cell set.

In one embodiment, the phrase that "the first cell set and the second cell set both correspond to a second indication value" includes a meaning that both a PDCCH scheduling a transmission in the first cell set and a PDCCH scheduling a transmission in the second cell set determine respectively occupied PDCCH candidates via the second indication value.

Embodiment 6

Figure 6:
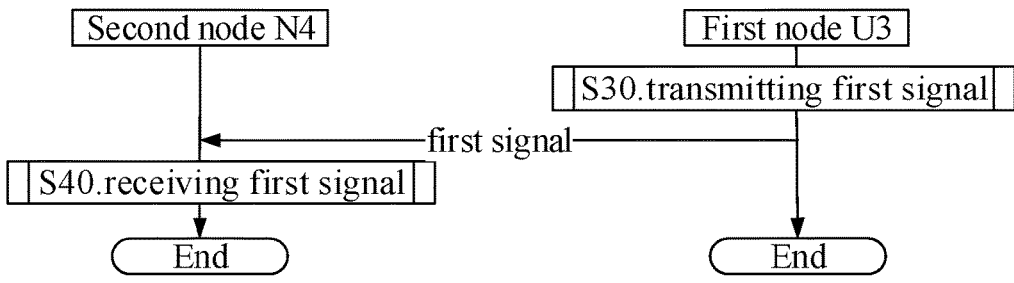
FIG. 6 illustrates a flowchart of transmission of a first signal according to one embodiment of the present application.

Embodiment 6 illustrates a flowchart of transmission of a first signal according to one embodiment of the present application, as shown in FIG. 6. In FIG. 6, a first node U3 and a second node N4 are in communication via a radio link. It should be particularly noted that the sequence illustrated herein does not set any limit to the signal transmission order or implementation order in the present application. In case of no conflict, the embodiments, subembodiments, and subsidiary embodiments in Embodiment 6 can be applied to any embodiment of Embodiment or Embodiment 7; reversely, in case of no conflict, any of the embodiments, subembodiments, and subsidiary embodiments in Embodiment 5 or 7 can be applied to Embodiment 6.

The first node U3 transmits a first signal in step S30.

The second node N4 receives a first signal in step S40.

In Embodiment 6, the first cell set corresponds to scheduling for downlink, while the second cell set corresponds to scheduling for uplink; the second cell set comprises W2 serving cells, W2 being a positive integer greater than 1, and the first signal comprises W2 first sub-signals, the W2 first sub-signals respectively occupying W2 frequency-domain resource sets corresponding to the W2 serving cells.

In one embodiment, a physical layer channel occupied by the first signal includes a PUSCH.

In one embodiment, a transport channel corresponding to the first signal includes an Uplink Shared Channel (UL-SCH).

In one embodiment, the W2 first sub-signals are respectively generated by W2 TBs.

In one embodiment, the W2 first sub-signals are respectively generated by W2 bit blocks.

In one embodiment, the W2 first sub-signals respectively occupy W2 HARQ process numbers.

In one embodiment, any frequency-domain resource set of the W2 frequency-domain resource sets occupies frequency-domain resources corresponding to a positive integer number of Resource Block(s) (RB(s)).

In one embodiment, the W2 frequency-domain resource sets are respectively located within frequency-band resources corresponding to the W2 serving cells.

In one embodiment, the W2 serving cells respectively correspond to W2 Component Carriers (CCs).

In one embodiment, the W2 serving cells respectively correspond to W2 BWPs.

In one embodiment, the W2 serving cells respectively correspond to W2 cells.

In one embodiment, the step S30 is taken after the step S11 in Embodiment 5.

In one embodiment, the step S40 is taken after the step S21 in Embodiment 5.

In one embodiment, the step S30 is taken concurrently with the step S11 in Embodiment 5.

In one embodiment, the step S40 is taken concurrently with the step S21 in Embodiment 5.

Embodiment 7

Figure 7:
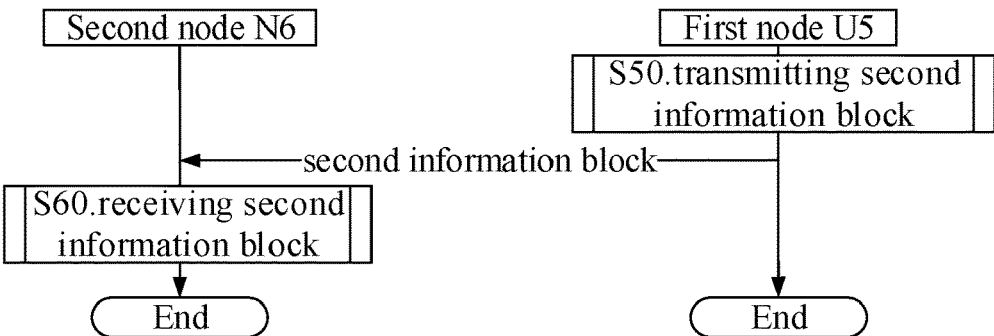
FIG. 7 illustrates a flowchart of transmission of a second information block according to one embodiment of the present application.

Embodiment 7 illustrates a flowchart of transmission of a second information block according to one embodiment of the present application, as shown in FIG. 7. In FIG. 7, a first node U5 and a second node N6 are in communication via a radio link. It should be particularly noted that the sequence illustrated herein does not set any limit to the signal transmission order or implementation order in the present application. In case of no conflict, the embodiments, subembodiments, and subsidiary embodiments in Embodiment 7 can be applied to any embodiment of Embodiment 5 or Embodiment 6; reversely, in case of no conflict, any of the embodiments, subembodiments, and subsidiary embodiments in Embodiment 5 or 6 can be applied to Embodiment 7.

The first node U5 transmits a second information block in step S50.

The second node N6 receives a second information block in step S60.

In Embodiment 7, the second information block is used to indicate a capability parameter set of a transmitter of the second information block, the capability parameter set of the transmitter of the second information block at least comprising a first parameter and a second parameter; the first parameter is used to indicate a number of downlink serving cells simultaneously scheduled by a PDCCH that are supported by the transmitter of the second information block, while the second parameter is used to indicate a number of uplink serving cells simultaneously scheduled by a PDCCH that are supported by the transmitter of the second information block.

In one embodiment, the second information block is transmitted via an air interface or a wireless interface.

In one embodiment, the second information block comprises all or part of a higher layer signaling or a physical layer signaling.

In one embodiment, the second information block is earlier than the first information block.

In one embodiment, the second information block is later than the first information block.

In one embodiment, the second information block comprises all or part of an RRC signaling, or the second information block comprises all or part of a MAC layer signaling.

In one embodiment, the second information block is transmitted through a PUSCH or a Physical Uplink Control Channel (PUCCH).

In one embodiment, the second information block is used to indicate capabilities of the first node in the present application.

In one embodiment, the technical feature that "the second information block is used to indicate a capability parameter set of a transmitter of the second information block" includes the following meaning: the second information block is used by the first node in the present application to indicate a capability parameter set of the first node.

In one embodiment, the technical feature that "the second information block is used to indicate a capability parameter set of a transmitter of the second information block" includes the following meaning: all or part of the second information block is used for explicitly or implicitly indicating a capability parameter set of a transmitter of the second information block.

In one embodiment, the second information block comprises an IE "Phy-ParametersFRX-Diff", or the second information block comprises an IE "UE-NR-Capability".

In one embodiment, the second information block comprises a field "pdcch-MonitoringCA".

In one embodiment, the second information block comprises a field "pdcch-BlindDetectionCA".

In one embodiment, the second information block comprises a field "CA-ParametersNR".

In one embodiment, the second information block comprises a field "searchSpaceSharingCA-DL".

In one embodiment, the second information block comprises a field "searchSpaceSharingCA-UL".

In one embodiment, the second information block comprises a field "SingleDCIMultipleCell-DL".

In one embodiment, the second information block comprises a field "SingleDCIMultipleCel-UL".

In one embodiment, the second information block comprises a field "SingleDCIMultipleCellsearchSpaceSharingCA-DL".

In one embodiment, the second information block comprises a field "SingleDCIMultipleCellsearchSpaceSharingCA-UL".

In one embodiment, the second information block comprises a field "Phy-Parameters".

In one embodiment, a capability parameter set of a transmitter of the second information block only comprises the first parameter and the second parameter.

In one embodiment, a capability parameter set of a transmitter of the second information block also comprises a parameter other than the first parameter and the second parameter.

In one embodiment, a capability parameter set of a transmitter of the second information block comprises a parameter in an IE "Phy-ParametersFRX-Diff".

In one embodiment, a capability parameter set of a transmitter of the second information block comprises a parameter in a field "pdcch-MonitoringCA".

In one embodiment, a capability parameter set of a transmitter of the second information block comprises a parameter in a field "pdcch-BlindDetectionCA".

In one embodiment, a capability parameter set of a transmitter of the second information block comprises a parameter in a field "CA-ParametersNR".

In one embodiment, a capability parameter set of a transmitter of the second information block comprises a parameter in a field "Phy-Parameters".

In one embodiment, the first parameter is different from the second parameter.

In one embodiment, the first parameter and the second parameter are respectively for a downlink and an uplink.

In one embodiment, the first parameter is per band, and the second parameter is per band.

In one embodiment, the first parameter is per CC, and the second parameter is per CC.

In one embodiment, the first parameter is per band combination, and the second parameter is per band combination.

In one embodiment, the first parameter is per feature set, and the second parameter is per feature set.

In one embodiment, the first parameter is a BOOLEAN, or the first parameter is an integer, or the first parameter is a serving cell list, or the first parameter is an ENUMERATED parameter, or the first parameter is a CHOICE type parameter, or the first parameter is a SEQUENCE type parameter.

In one embodiment, the second parameter is a BOOLEAN, or the second parameter is an integer, or the second parameter is a serving cell list, or the second parameter is an ENUMERATED parameter, or the second parameter is a CHOICE type parameter, or the second parameter is a SEQUENCE type parameter.

In one embodiment, a transmitter of the second information block is the first node in the present application.

In one embodiment, a number of downlink serving cell(s) simultaneously scheduled by a PDCCH being supported by the transmitter of the second information block can be equal to 1 or greater than 1.

In one embodiment, a number of uplink serving cell(s) simultaneously scheduled by a PDCCH being supported by the transmitter of the second information block can be equal to 1 or greater than 1.

In one embodiment, a number of downlink serving cell(s) simultaneously scheduled by a PDCCH being supported by the transmitter of the second information block is equal to or less than a number of PDSCH(s) simultaneously scheduled by a PDCCH being supported by the transmitter of the second information block.

In one embodiment, a number of downlink serving cell(s) simultaneously scheduled by a PDCCH being supported by the transmitter of the second information block is no greater than a number of downlink TB(s) simultaneously scheduled by a PDCCH being supported by the transmitter of the second information block.

In one embodiment, a number of uplink serving cell(s) simultaneously scheduled by a PDCCH being supported by the transmitter of the second information block is equal to or less than a number of PUSCH(s) simultaneously scheduled by a PDCCH being supported by the transmitter of the second information block.

In one embodiment, a number of uplink serving cell(s) simultaneously scheduled by a PDCCH being supported by the transmitter of the second information block is no greater than a number of uplink TB(s) simultaneously scheduled by a PDCCH being supported by the transmitter of the second information block.

In one embodiment, downlink serving cells simultaneously scheduled by a PDCCH are serving cells simultaneously scheduled by a same DL grant or DL assignment.

In one embodiment, downlink serving cells simultaneously scheduled by a PDCCH are downlink serving cells that a same PDCCH can schedule at most simultaneously.

In one embodiment, downlink serving cells simultaneously scheduled by a PDCCH are serving cells to which all downlink channels or signals simultaneously scheduled by a same PDCCH respectively belong.

In one embodiment, downlink serving cells simultaneously scheduled by a PDCCH are serving cells to which all downlink channels or signals simultaneously scheduled by a DCI format carried by a same PDCCH candidate respectively belong.

In one embodiment, downlink serving cells simultaneously scheduled by a PDCCH are downlink serving cells simultaneously scheduled by a same DCI format.

In one embodiment, downlink serving cells simultaneously scheduled by a PDCCH are serving cells to which all PDSCHs simultaneously scheduled by a same PDCCH respectively belong.

In one embodiment, downlink serving cells simultaneously scheduled by a PDCCH are serving cells to which all PDSCHs simultaneously scheduled by a same DCI format respectively belong.

In one embodiment, uplink serving cells simultaneously scheduled by a PDCCH are serving cells simultaneously scheduled by a same UL grant or UL assignment.

In one embodiment, uplink serving cells simultaneously scheduled by a PDCCH are uplink serving cells that a same PDCCH can schedule at most simultaneously.

In one embodiment, uplink serving cells simultaneously scheduled by a PDCCH are serving cells to which all uplink channels or signals simultaneously scheduled by a same PDCCH respectively belong.

In one embodiment, uplink serving cells simultaneously scheduled by a PDCCH are serving cells to which all uplink channels or signals simultaneously scheduled by a DCI format carried by a same PDCCH candidate respectively belong.

In one embodiment, uplink serving cells simultaneously scheduled by a PDCCH are serving cells to which all uplink channels or signals simultaneously scheduled by a same DCI format respectively belong.

In one embodiment, uplink serving cells simultaneously scheduled by a PDCCH are serving cells to which all PUSCHs simultaneously scheduled by a same DCI format respectively belong.

In one embodiment, uplink serving cells simultaneously scheduled by a PDCCH are serving cells to which all PUSCHs simultaneously scheduled by a same PDCCH respectively belong.

In one embodiment, the technical feature that "the first parameter is used to indicate a number of downlink serving cells simultaneously scheduled by a PDCCH that are supported by the transmitter of the second information block" includes the following meaning: the first parameter is used by the first node in the present application to indicate a number of downlink serving cells simultaneously scheduled by a PDCCH that are supported by the transmitter of the second information block.

In one embodiment, the technical feature that "the first parameter is used to indicate a number of downlink serving cells simultaneously scheduled by a PDCCH that are supported by the transmitter of the second information block" includes the following meaning: the first parameter is used for explicitly or implicitly indicating a number of downlink serving cells simultaneously scheduled by a PDCCH that are supported by the transmitter of the second information block.

In one embodiment, the technical feature that "the first parameter is used to indicate a number of downlink serving cells simultaneously scheduled by a PDCCH that are supported by the transmitter of the second information block" includes the following meaning: the first parameter is used for indicating whether the transmitter of the second information block supports one PDCCH in scheduling multiple downlink serving cells simultaneously.

In one embodiment, the technical feature that "the first parameter is used to indicate a number of downlink serving cells simultaneously scheduled by a PDCCH that are supported by the transmitter of the second information block" includes the following meaning: the first parameter is used for indicating a maximum number of downlink serving cells simultaneously scheduled by a PDCCH that are supported by the transmitter of the second information block.

In one embodiment, the technical feature that "the first parameter is used to indicate a number of downlink serving cells simultaneously scheduled by a PDCCH that are supported by the transmitter of the second information block" includes the following meaning: the first parameter is used for indicating whether the transmitter of the second information block supports one PDCCH in scheduling multiple downlink serving cells simultaneously, and, when the transmitter of the second information block supports one PDCCH in scheduling multiple downlink serving cells simultaneously, indicating a maximum number of downlink serving cells simultaneously scheduled by one PDCCH being supported by the transmitter of the second information block.

In one embodiment, the technical feature that "the first parameter is used to indicate a number of downlink serving cells simultaneously scheduled by a PDCCH that are supported by the transmitter of the second information block" includes the following meaning: the first parameter is used for indicating whether the transmitter of the second information block supports one PDCCH in scheduling multiple downlink serving cells simultaneously; when the first parameter indicates that the transmitter of the second information block supports one PDCCH in scheduling multiple downlink serving cells simultaneously, a parameter other than the first parameter or the second parameter comprised by a capability parameter set of the transmitter of the second information block is used to indicate a maximum number of downlink serving cells simultaneously scheduled by one PDCCH being supported by the transmitter of the second information block.

In one embodiment, the technical feature that "the first parameter is used to indicate a number of downlink serving cells simultaneously scheduled by a PDCCH that are supported by the transmitter of the second information block" includes the following meaning: the first parameter is used for indicating whether the transmitter of the second information block supports one PDCCH in scheduling multiple downlink serving cells simultaneously; when the first parameter indicates that the transmitter of the second information block supports one PDCCH in scheduling multiple downlink serving cells simultaneously, a parameter other than the first parameter or the second parameter comprised by a capability parameter set of the transmitter of the second information block is used to indicate a maximum number of carriers of a downlink CA supported by the transmitter of the second information block, where a maximum number of downlink serving cells simultaneously scheduled by one PDCCH being supported by the transmitter of the second information block is equal to the maximum number of carriers of the downlink CA supported by the transmitter of the second information block.

In one embodiment, the statement that "a number of downlink serving cell(s) simultaneously scheduled by a PDCCH that is/are supported by the transmitter of the second information block is equal to 1" and the statement that "the transmitter of the second information block only supports one PDCCH only capable of scheduling a single downlink serving cell" have equivalent meaning or can be replaced by each other.

In one embodiment, the statement that "a number of downlink serving cells simultaneously scheduled by a PDCCH that are supported by the transmitter of the second information block is greater than 1" and the statement that "the transmitter of the second information block supports one PDCCH in scheduling multiple downlink serving cell simultaneously" have equivalent meaning or can be replaced by each other.

In one embodiment, when the transmitter of the second information block supports one PDCCH in scheduling multiple downlink serving cells simultaneously, the transmitter of the second information block no doubt supports one PDCCH in scheduling one downlink serving cell.

In one embodiment, the technical feature that "the first parameter is used to indicate a number of downlink serving cells simultaneously scheduled by a PDCCH that are supported by the transmitter of the second information block" includes the following meaning: the first parameter is used for indicating a number of downlink serving cells simultaneously scheduled by a PDCCH that are supported by the transmitter of the second information block per band.

In one embodiment, the technical feature that "the first parameter is used to indicate a number of downlink serving cells simultaneously scheduled by a PDCCH that are supported by the transmitter of the second information block" includes the following meaning: the first parameter is used for indicating a number of downlink serving cells simultaneously scheduled by a PDCCH that are supported by the transmitter of the second information block per band combination.

In one embodiment, the technical feature that "the first parameter is used to indicate a number of uplink serving cells simultaneously scheduled by a PDCCH being supported by the transmitter of the second information block" includes the following meaning: the first parameter is used by the first node in the present application to indicate a number of uplink serving cells simultaneously scheduled by a PDCCH that are supported by the transmitter of the second information block.

In one embodiment, the technical feature that "the first parameter is used to indicate a number of uplink serving cells simultaneously scheduled by a PDCCH being supported by the transmitter of the second information block" includes the following meaning: the first parameter is used for explicitly or implicitly indicating a number of uplink serving cells simultaneously scheduled by a PDCCH that are supported by the transmitter of the second information block.

In one embodiment, the technical feature that "the first parameter is used to indicate a number of uplink serving cells simultaneously scheduled by a PDCCH being supported by the transmitter of the second information block" includes the following meaning: the first parameter is used for indicating whether the transmitter of the second information block supports one PDCCH in scheduling multiple uplink serving cells simultaneously.

In one embodiment, the technical feature that "the first parameter is used to indicate a number of uplink serving cells simultaneously scheduled by a PDCCH being supported by the transmitter of the second information block" includes the following meaning: the first parameter is used for indicating a maximum number of uplink serving cells simultaneously scheduled by a PDCCH that are supported by the transmitter of the second information block.

In one embodiment, the technical feature that "the first parameter is used to indicate a number of uplink serving cells simultaneously scheduled by a PDCCH being supported by the transmitter of the second information block" includes the following meaning: the first parameter is used for indicating whether the transmitter of the second information block supports one PDCCH in scheduling multiple uplink serving cells simultaneously, and, when the transmitter of the second information block supports one PDCCH in scheduling multiple uplink serving cells simultaneously, indicating a maximum number of uplink serving cells simultaneously scheduled by one PDCCH being supported by the transmitter of the second information block.

In one embodiment, the technical feature that "the first parameter is used to indicate a number of uplink serving cells simultaneously scheduled by a PDCCH being supported by the transmitter of the second information block" includes the following meaning: the first parameter is used for indicating whether the transmitter of the second information block supports one PDCCH in scheduling multiple uplink serving cells simultaneously; when the transmitter of the second information block supports one PDCCH in scheduling multiple uplink serving cells simultaneously, a parameter other than the first parameter or the second parameter comprised by a capability parameter set of the transmitter of the second information block is used to indicate a maximum number of uplink serving cells simultaneously scheduled by one PDCCH being supported by the transmitter of the second information block.

In one embodiment, the technical feature that "the first parameter is used to indicate a number of uplink serving cells simultaneously scheduled by a PDCCH being supported by the transmitter of the second information block" includes the following meaning: the first parameter is used for indicating whether the transmitter of the second information block supports one PDCCH in scheduling multiple uplink serving cells simultaneously; when the transmitter of the second information block supports one PDCCH in scheduling multiple uplink serving cells simultaneously, a parameter other than the first parameter or the second parameter comprised by a capability parameter set of the transmitter of the second information block is used to indicate a maximum number of carriers of an uplink CA supported by the transmitter of the second information block, where a maximum number of uplink serving cells simultaneously scheduled by one PDCCH being supported by the transmitter of the second information block is equal to the maximum number of carriers of the uplink CA supported by the transmitter of the second information block.

In one embodiment, the statement that "a number of uplink serving cell(s) simultaneously scheduled by a PDCCH that is/are supported by the transmitter of the second information block is equal to 1" and the statement that "the transmitter of the second information block only supports one PDCCH only capable of scheduling a single uplink serving cell" have equivalent meaning or can be replaced by each other.

In one embodiment, the statement that "a number of uplink serving cells simultaneously scheduled by a PDCCH that are supported by the transmitter of the second information block is greater than 1" and the statement that "the transmitter of the second information block supports one PDCCH in scheduling multiple uplink serving cell simultaneously" have equivalent meaning or can be replaced by each other.

In one embodiment, when the transmitter of the second information block supports one PDCCH in scheduling multiple uplink serving cells simultaneously, the transmitter of the second information block no doubt supports one PDCCH in scheduling one uplink serving cell.

In one embodiment, the technical feature that "the first parameter is used to indicate a number of uplink serving cells simultaneously scheduled by a PDCCH being supported by the transmitter of the second information block" includes the following meaning: the first parameter is used for indicating a number of uplink serving cells simultaneously scheduled by a PDCCH that are supported by the transmitter of the second information block per band.

In one embodiment, the technical feature that "the first parameter is used to indicate a number of uplink serving cells simultaneously scheduled by a PDCCH being supported by the transmitter of the second information block" includes the following meaning: the first parameter is used for indicating a number of uplink serving cells simultaneously scheduled by a PDCCH that are supported by the transmitter of the second information block per band combination.

In one embodiment, the first parameter corresponds to a value of P in the present application.

In one embodiment, the first parameter corresponds to the first threshold in the present application.

In one embodiment, the second parameter corresponds to the first threshold in the present application.

In one embodiment, the step S50 is taken before the step S10 in Embodiment 5.

In one embodiment, the step S60 is taken before the step S20 in Embodiment 5.

Embodiment 8

Figure 8:
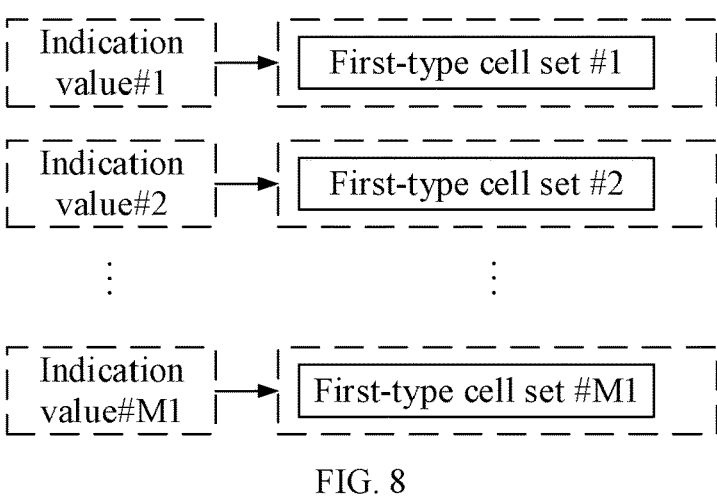
FIG. 8 illustrates a schematic diagram of M1 first-type cell sets according to one embodiment of the present application.

Embodiment 8 illustrates a schematic diagram of M1 first-type cell sets according to one embodiment of the present application, as shown in FIG. 8. In FIG. 8, the M1 first-type cell sets respectively correspond to a first-type cell set #1 through a first-type cell set #M1 shown in FIG. 8; the target field comprised in the first signaling can indicate any value from an indication value #1 to an indication value #M1; the indication value #1 through the indication value #M1 are respectively associated with the first-type cell set #1 through the first-type cell set #M1.

In one embodiment, any indication value from the indication value #1 to the indication value #M1 is a non-negative integer.

In one embodiment, any first-type cell set among the M1 first-type cell sets is used for downlink scheduling.

Embodiment 9

Figure 9:
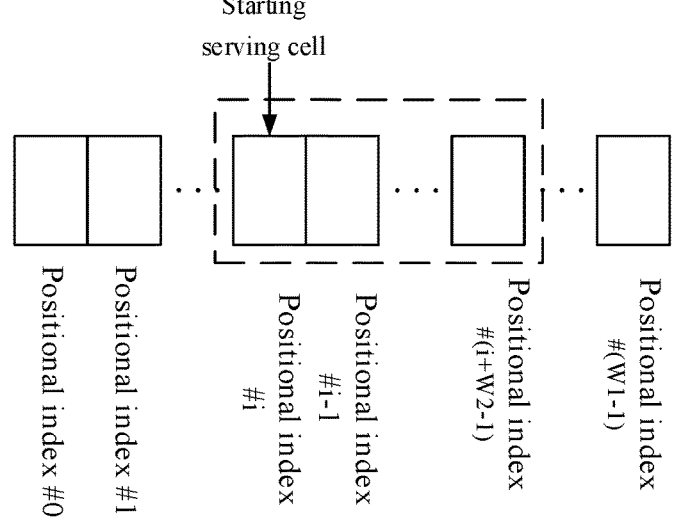
FIG. 9 illustrates a schematic diagram of a first cell set and a second cell set according to one embodiment of the present application.

Embodiment 9 illustrates a schematic diagram of a first cell set and a second cell set according to one embodiment of the present application, as shown in FIG. 9. In FIG. 9, each rectangular box represents a serving cell comprised by the first cell set, the first cell set comprising W1 serving cells, the W1 serving cells respectively corresponding to W1 positional indexes, where the W1 positional indexes are respectively a positional index #0 through a positional index #(W1-1) shown in FIG. 9; the second cell set comprises W2 serving cells of the W1 serving cells, where W2 positional indexes for the W2 serving cells are consecutive; the W2 positional indexes for the W2 serving cells are respectively a positional index #i through a positional index #(i+W2-1); the broken-line box in the figure corresponds to the W2 serving cells.

In one embodiment, the W1 serving cells are sorted in an ascending order according to cell identifiers, and correspondingly there form the W1 positional indexes.

In one embodiment, the W1 serving cells are sorted in a descending order according to cell identifiers, and correspondingly there form the W1 positional indexes.

Embodiment 10

Figure 10:
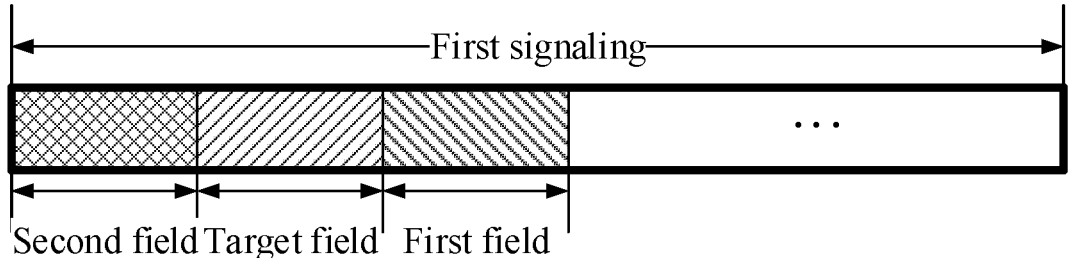
FIG. 10 illustrates a schematic diagram of a first signaling according to one embodiment of the present application.

Embodiment 10 illustrates a schematic diagram of a first signaling according to one embodiment of the present application, as shown in FIG. 10. In FIG. 10, the first signaling comprises a target field, a first field and a second field.

In one embodiment, the target field comprised by the first signaling is used to indicate the first cell set among the M1 first-type cell sets.

In one embodiment, the first field comprised by the first signaling is used to indicate the second cell set in the first cell set.

In one embodiment, the second field comprised by the first signaling is used to determine a direction of a link scheduled by the first signaling.

In one embodiment, the second field comprised by the first signaling is used to indicate a direction of a link scheduled by the first signaling.

In one embodiment, the second field comprised by the first signaling is used to determine whether the first field is used to indicate the second cell set in the first cell set.

In one subembodiment, the second field is equal to "1", the first field not being used to indicate the second cell set in the first cell set.

In one subembodiment, the second field is equal to "1", the first field being of a fixed value.

In one subembodiment, the second field is equal to "1", the first field being used for padding check bits.

In one subembodiment, the second field is equal to "0", the first field being used to indicate the second cell set in the first cell set.

Embodiment 11

Figure 11:
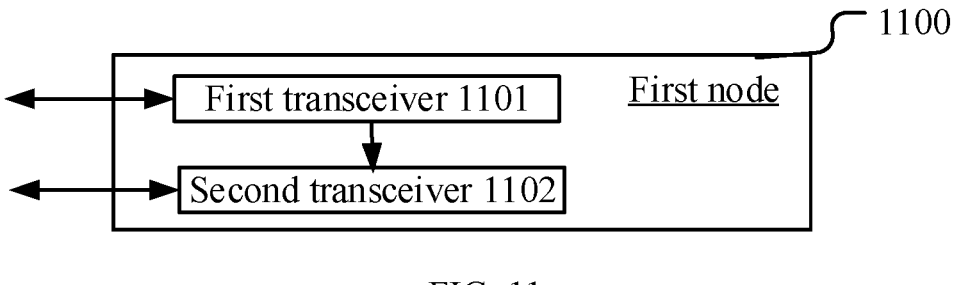
FIG. 11 illustrates a structure block diagram of a processing device used in a first node according to one embodiment of the present application.

Embodiment 11 illustrates a structure block diagram of a first node, as shown in FIG. 11. In FIG. 11, a first node 1100 comprises a first transceiver 1101 and a second transceiver 1102.

The first transceiver 1101 receives a first information block, the first information block being used to determine M1 first-type cell sets, any first-type cell set of the M1 first-type cell sets comprising at least one serving cell, M1 being a positive integer greater than 1; and the second transceiver receives a first signaling, the first signaling being used to determine a first cell set out of the M1 first-type cell sets, the first cell set comprising multiple serving cells.

In Embodiment 11, the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the first indication value is linear with an index of the starting serving cell in the first cell set; the first quantity value is no greater than a first threshold, the first threshold being a positive integer; the first threshold is equal to a parameter value of a capability report of the first node, or the first threshold is configurable.

In one embodiment, a number of serving cells comprised in a given first-type cell set among the M1 first-type cell sets is no less than a number of serving cells comprised in any first-type cell set among the M1 first-type cell sets; the given first-type cell set comprises P serving cells; P is a positive integer greater than 1; the first threshold is related to a value of P or is related to a value of M1.

In one embodiment, the first field comprised in the first signaling occupies X1 bits, where X1 is a positive integer greater than 1, and a value of X1 is related to the first threshold.

In one embodiment, the first cell set comprises W1 serving cells, and the W1 serving cells are sorted in an order according to cell identifiers; the second cell set comprises W2 serving cells of the W1 serving cells, where the starting serving cell is a first one of the W2 serving cells, and the first quantity value is equal to a value of W2; W2 is a positive integer no greater than W1.

In one embodiment, the W2 serving cells are consecutive among the W1 serving cells.

In one embodiment, comprising:

the second transceiver 1102, transmitting a first signal;

herein, the first cell set corresponds to scheduling for downlink, while the second cell set corresponds to scheduling for uplink; the second cell set comprises W2 serving cells, W2 being a positive integer greater than 1, and the first signal comprises W2 first sub-signals, the W2 first sub-signals respectively occupying W2 frequency-domain resource sets corresponding to the W2 serving cells.

In one embodiment, the first cell set and the second cell set both correspond to a second indication value, the second indication value being a non-negative integer; the second indication value is used to determine at least one CCE occupied by the first signaling, the first signaling determining the second indication value.

In one embodiment, comprising:

the first transceiver 1101, transmitting a second information block;

herein, the second information block is used to indicate a capability parameter set of a transmitter of the second information block, the capability parameter set of the transmitter of the second information block at least comprising a first parameter and a second parameter; the first parameter is used to indicate a number of downlink serving cells simultaneously scheduled by a PDCCH that are supported by the transmitter of the second information block, while the second parameter is used to indicate a number of uplink serving cells simultaneously scheduled by a PDCCH that are supported by the transmitter of the second information block.

In one embodiment, the first transceiver 1101 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

In one embodiment, the second transceiver 1102 comprises at least the first six of the antenna 452, the receiver/transmitter 454, the multi-antenna receiving processor 458, the multi-antenna transmitting processor 457, the receiving processor 456, the transmitting processor 468 and the controller/processor 459 in Embodiment 4.

Embodiment 12

Figure 12:
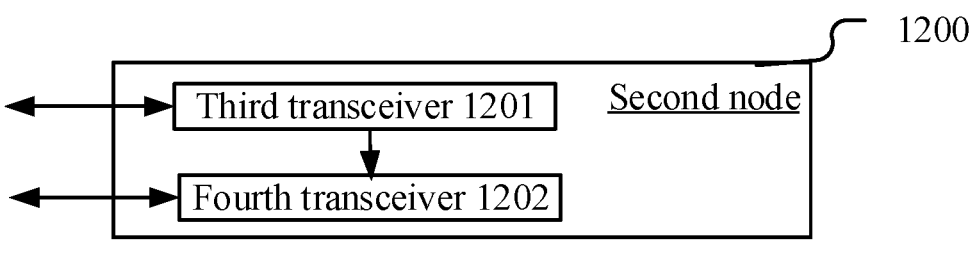
FIG. 12 illustrates a structure block diagram of a processing device used in a second node according to one embodiment of the present application.

Embodiment 12 illustrates a structure block diagram of a second node, as shown in FIG. 12. In FIG. 12, a second node 1200 comprises a third transceiver 1201 and a fourth transceiver 1202.

The third transceiver 1201 transmits a first information block, the first information block being used to determine M1 first-type cell sets, any first-type cell set of the M1 first-type cell sets comprising at least one serving cell, M1 being a positive integer greater than 1; and the fourth transceiver 1202 transmits a first signaling, the first signaling being used to determine a first cell set out of the M1 first-type cell sets, the first cell set comprising multiple serving cells.

In Embodiment 12, the first signaling comprises a first field and a second field, where the first field comprised in the first signaling is used to determine a first indication value, the first indication value being a non-negative integer; the first indication value corresponds to a starting serving cell and a first quantity value, where the starting serving cell is a serving cell comprised in the first cell set, and the first quantity value is a positive integer; the starting serving cell is a serving cell in a second cell set, the second cell set comprising at least one serving cell, and any serving cell comprised in the second cell set belonging to the first cell set, with a number of serving cells comprised in the second cell set being equal to the first quantity value; the first cell set and the second cell set respectively correspond to schedulings of links in different directions, where the second field comprised in the first signaling is used to determine a direction of a link scheduled by the first signaling.

In one embodiment, the first indication value is linear with an index of the starting serving cell in the first cell set; the first quantity value is no greater than a first threshold, the first threshold being a positive integer; the first threshold is equal to a parameter value of a capability report of the first node, or the first threshold is configurable.

In one embodiment, a number of serving cells comprised in a given first-type cell set among the M1 first-type cell sets is no less than a number of serving cells comprised in any first-type cell set among the M1 first-type cell sets; the given first-type cell set comprises P serving cells; P is a positive integer greater than 1; the first threshold is related to a value of P or is related to a value of M1.

In one embodiment, the first field comprised in the first signaling occupies X1 bits, where X1 is a positive integer greater than 1, and a value of X1 is related to the first threshold.

In one embodiment, the first cell set comprises W1 serving cells, and the W1 serving cells are sorted in an order according to cell identifiers; the second cell set comprises W2 serving cells of the W1 serving cells, where the starting serving cell is a first one of the W2 serving cells, and the first quantity value is equal to a value of W2; W2 is a positive integer no greater than W1.

In one embodiment, the W2 serving cells are consecutive among the W1 serving cells.

In one embodiment, comprising:

the fourth transceiver 1202, receiving a first signal;

herein, the first cell set corresponds to scheduling for downlink, while the second cell set corresponds to scheduling for uplink; the second cell set comprises W2 serving cells, W2 being a positive integer greater than 1, and the first signal comprises W2 first sub-signals, the W2 first sub-signals respectively occupying W2 frequency-domain resource sets corresponding to the W2 serving cells.

In one embodiment, the first cell set and the second cell set both correspond to a second indication value, the second indication value being a non-negative integer; the second indication value is used to determine at least one CCE occupied by the first signaling, the first signaling determining the second indication value.

In one embodiment, comprising:

the third transceiver 1201, receiving a second information block;

herein, the second information block is used to indicate a capability parameter set of a transmitter of the second information block, the capability parameter set of the transmitter of the second information block at least comprising a first parameter and a second parameter; the first parameter is used to indicate a number of downlink serving cells simultaneously scheduled by a PDCCH that are supported by the transmitter of the second information block, while the second parameter is used to indicate a number of uplink serving cells simultaneously scheduled by a PDCCH that are supported by the transmitter of the second information block.

In one embodiment, the first cell set and the second cell set both correspond to a first indication value, the first indication value being a non-negative integer; the first indication value is used to determine at least one CCE occupied by the first signaling, the first signaling determining the first indication value.

In one embodiment, the third transceiver 1201 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

In one embodiment, the fourth transceiver 1202 comprises at least the first six of the antenna 420, the transmitter/receiver 418, the multi-antenna transmitting processor 471, the multi-antenna receiving processor 472, the transmitting processor 416, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The first node in the present application includes but is not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, airplanes, unmanned aerial vehicles, telecontrolled aircrafts, etc. The second node in the present application includes but is not limited to macro-cellular base stations, micro-cellular base stations, home base stations, relay base station, eNB, gNB, Transmitter Receiver Point (TRP), GNSS, relay satellite, satellite base station, airborne base station, RSU, unmanned ariel vehicle, test equipment like transceiving device simulating partial functions of base station or signaling tester, and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:
   a transceiver; and
   a processor, wherein the transceiver and the processor are configured to:
   receive a first information block,
   determine, based on the first information block, determine a first set of first-type cell sets, and
   receive a first signaling comprising a first field and a second field,
   determine, based on the first signaling, a first cell set out of the first set of first-type cell sets, wherein the first cell set comprises a plurality of serving cells,
   determine, based on the first field, a starting serving cell from the first cell set and a number of serving cells in a second cell set,
   determine the second cell set based on the starting serving cell and the number of serving cells in the second cell set, wherein each serving cell in the second cell set belongs to the first cell, and wherein the first cell set and the second cell set respectively correspond to schedulings of links in different directions, and
   determine, based on the second field, a direction of a link scheduled by the first signaling.

2. The UE according to claim 1, wherein the first field is indicative of a first indication value that is linear with an index of the starting serving cell in the first cell set, and wherein the number of serving cells in a second cell set is not greater than a first threshold, and wherein the first threshold is equal to a parameter value of a capability report of the UE, or the first threshold is configurable.

3. The UE according to claim 2, wherein a number of serving cells comprised in a given first-type cell set among the first set of first-type cell sets is not less than a number of serving cells comprised in any first-type cell set among the first set of first-type cell sets, and wherein the given first-type cell set comprises a set of serving cells and wherein the first threshold is related to a value of a number of sets of serving cells in the given first-type cell set or is related to a value of a number of first-type cell sets in the first set of first-type cell sets.

4. The UE according to claim 3, wherein the first field comprised in the first signaling occupies X1 bits, where X1 is a positive integer greater than 1, and a value of X1 is related to the first threshold.

5. The UE according to claim 1, wherein the first cell set comprises W1 serving cells, and wherein the W1 serving cells are sorted in an order according to cell identifiers, and wherein the second cell set comprises W2 serving cells of the W1 serving cells, and wherein where the starting serving cell is a first one of the W2 serving cells, and wherein the number of serving cells in a second cell set is equal to a value of W2, and wherein W2 is a positive integer no greater than W1.

6. The UE according to claim 5, wherein the W2 serving cells are consecutive among the W1 serving cells.

7. The UE according to claim 1, wherein the transceiver and the processor are configured to:
   transmit a first signal, wherein the first cell set corresponds to scheduling for downlink and the second cell set corresponds to scheduling for uplink, and wherein the second cell set comprises W2 serving cells, W2 being a positive integer greater than 1, and wherein the first signal comprises W2 first sub-signals, the W2 first sub-signals respectively occupying W2 frequency-domain resource sets corresponding to the W2 serving cells.

8. The UE according to claim 1, wherein the first cell set and the second cell set both correspond to a second indication value, the second indication value being a non-negative integer, and wherein the second indication value is used to determine at least one Control Channel Element (CCE) occupied by the first signaling, the first signaling determining the second indication value.

9. The UE according to claim 1, wherein the transceiver and the processor are configured to:
   transmit a second information block, wherein the second information block is indicative of a capability parameter set of a transmitter of the second information block, the capability parameter set of the transmitter of the second information block at least comprising a first parameter and a second parameter, and wherein the first parameter is used to indicate a number of downlink serving cells simultaneously scheduled by a Physical Downlink Control Channel (PDCCH) that are supported by the transmitter of the second information block, and the second parameter is used to indicate a number of uplink serving cells simultaneously scheduled by a PDCCH that are supported by the transmitter of the second information block.

10. The UE according to claim 1, wherein any serving cell comprised in the second cell set is used for uplink scheduling, while any serving cell comprised in the first cell set is used for downlink scheduling.

11. The UE according to claim 1, wherein the first field comprised in the first signaling is used for scheduling one serving cell or multiple serving cells simultaneously.

12. A base station for wireless communications, the base station comprising:
   a transceiver; and
   a processor, wherein the transceiver and the processor are configured to:
   transmit a first information block, wherein the first information block is used to determine a set of first-type cell sets,
   transmit a first signaling,
   wherein the first signaling comprises a first field used to determine a first indication value corresponding to a starting serving cell and a first quantity value, and wherein the starting serving cell is a serving cell comprised in the first cell set and a second cell set, and wherein any serving cell comprised in the second cell set belongs to the first cell set, with a number of serving cells comprised in the second cell set being equal to the first quantity value, and wherein the first signaling is used to determine a first cell set out of the first set of first-type cell sets, and wherein the first cell set comprises a plurality of serving cells, wherein the first cell set and the second cell set respectively correspond to schedulings of links in different directions, and wherein a second field comprised in the first signaling is used to determine a direction of a link scheduled by the first signaling.

13. The base station according to claim 12, wherein that the first indication value is linear with an index of the starting serving cell in the first cell set, and wherein the first quantity value is no greater than a first threshold, and wherein the first threshold is equal to a parameter value of a capability report of the US, or the first threshold is configurable.

14. The base station according to claim 13, characterized in that a number of serving cells comprised in a given first-type cell set among the first set of first-type cell sets is no less than a number of serving cells comprised in any given first-type cell set among the first set of first-type cell sets, and wherein the given first-type cell set comprises P serving cells, and wherein the first threshold is related to a value of P or is related to a value of M1.

15. The base station according to claim 14, wherein the first field comprised in the first signaling occupies X1 bits, where X1 is a positive integer greater than 1, and a value of X1 is related to the first threshold.

16. The base station according to claim 12, wherein the first cell set comprises W1 serving cells, and the W1 serving cells are sorted in an order according to cell identifiers, and wherein the second cell set comprises W2 serving cells of the W1 serving cells, where the starting serving cell is a first one of the W2 serving cells, and the first quantity value is equal to a value of W2, and wherein W2 is a positive integer no greater than W1.

17. The base station according to claim 16, wherein the W2 serving cells are consecutive among the W1 serving cells.

18. The base station according to claim 12, wherein the ransceiver and the processor are further configured to:
    receive a first signal, wherein the first cell set corresponds to scheduling for downlink and the second cell set corresponds to scheduling for uplink, and wherein the second cell set comprises W2 serving cells and wherein the first signal comprises W2 first sub-signals, and wherein the W2 first sub-signals respectively occupying W2 frequency-domain resource sets corresponding to the W2 serving cells.

19. The base station according to claim 12, wherein the first cell set and the second cell set both correspond to a second indication value, the second indication value being a non-negative integer, and wherein the second indication value is used to determine at least one CCE occupied by the first signaling, the first signaling determining the second indication value.

20. A method in a user equipment (UE) for wireless communications, the method comprising:
    receiving a first information block;
    determining, based on the first information block, a first set of first-type cell sets; and
    receiving a first signaling comprising a first field and a second field;
    determining, based on the first signaling, a first cell set out of the first set of first-type cell sets, wherein the first cell set comprises a plurality of serving cells;
    determining, based on the first field, a starting serving cell from the first cell set and a number of serving cells in a second cell set;
    determining the second cell set based on the starting serving cell and the number of serving cells in the second cell set, wherein each serving cell in the second cell set belongs to the first cell, and wherein the first cell set and the second cell set respectively correspond to schedulings of links in different directions; and
    determining, based on the second field, a direction of a link scheduled by the first signaling.

* * * * *